(12) United States Patent
Vicktorius

(10) Patent No.: US 6,396,007 B1
(45) Date of Patent: May 28, 2002

(54) INSTALLATION SWITCH FOR BUILDING INSTALLATION

(75) Inventor: Richard Vicktorius, Cologne (DE)

(73) Assignee: Merten GmbH & Co. KG, Wiehl (DE)

( * ) Notice: Subject to any disclaimer, the term of this patent is extended or adjusted under 35 U.S.C. 154(b) by 0 days.

(21) Appl. No.: 09/520,988

(22) Filed: Mar. 8, 2000

(30) Foreign Application Priority Data

Mar. 9, 1999 (DE) .................................. 299 04 174 U

(51) Int. Cl.$^7$ ................................................ H01H 9/00
(52) U.S. Cl. .................. 200/5 A; 200/293; 200/296; 200/51 R; 341/22; 345/168; 345/173; 379/368
(58) Field of Search ................. 200/1 R, 5 A, 200/18, 600, 512, 293, 294, 296, 297, 303, 51 R, 51.05, 51.11; 341/22; 345/168, 173; 379/368–370

(56) References Cited

U.S. PATENT DOCUMENTS

| | | | | |
|---|---|---|---|---|
| 4,056,699 A | * | 11/1977 | Jordan ........................ | 200/5 A |
| 4,942,275 A | * | 7/1990 | Addy et al. .................. | 200/308 |
| 5,587,567 A | * | 12/1996 | Winter et al. ................ | 187/395 |
| 5,654,701 A | * | 8/1997 | Liao et al. .................... | 341/22 |
| 5,736,975 A | * | 4/1998 | Lunetta ....................... | 345/156 |
| 6,137,072 A | * | 10/2000 | Martter et al. .............. | 200/512 |

FOREIGN PATENT DOCUMENTS

WO           92/04724        8/1991    .......... H01H/13/70

* cited by examiner

*Primary Examiner*—Michael Friedhofer
(74) *Attorney, Agent, or Firm*—Diller, Ramik & Wight

(57) ABSTRACT

The installation switch includes an installation box (10) having a support plate (15) for attachment to a wall. Arranged in front of the installation housing (10) is a base portion (18) carrying a touch panel (19). The touch panel (19) comprises a transparent plate provided with transparent switch elements and projects into the room.

22 Claims, 5 Drawing Sheets

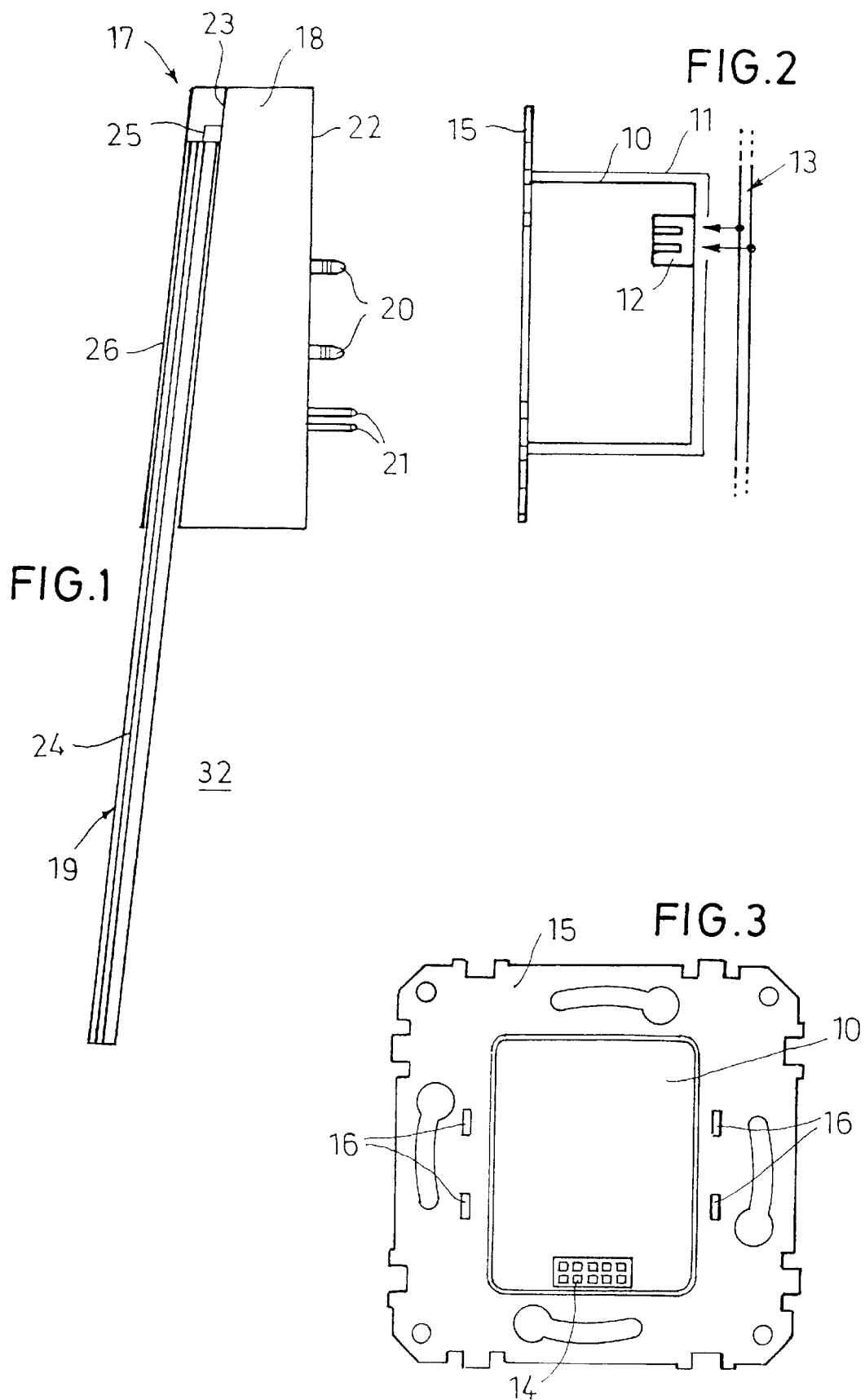

INSTALLATION SWITCH FOR BUILDING INSTALLATION

BACKGROUND OF THE INVENTION

The invention relates to an installation switch for building installation, and particularly a switch for switching the mains voltage as well as a switch for switching a low voltage.

The switches commonly used for building installation are mechanical switches comprising a switching lever arranged to connect various contacts. Further, touch-operated switches exist wherein a sensor face is merely touched to initiate a switching process. Touch switches of this type have an installation housing sized to fit into the installation box and containing the electronics. The installation box has a touch panel arranged externally thereof. The outer appearance of such touch switches is similar to that of usual mechanical installation switches.

A touch switch element known from WO 92/04724 is arranged between two glass plates. By application of pressure on the glass plates, these are locally pressed together, thus closing an electric contact at the pressure site. These glass plates form a transparent plate structure. The electric traces arranged therebetween are likewise made from a transparent material which is hardly visible by the unaided eye.

SUMMARY OF THE INVENTION

It is an object of the invention to provide an installation switch for building installation which, as compared to conventional installation switches, offers a wider variability regarding the switching functions, the constructional design and the outer appearance.

In the installation switch of the invention, the touch panel is provided as a transparent plate comprising at least one pressure-actuated switch organ. This plate is a component of a largely nondistinct optical appearance and is not easily discernible as a switch or operating element. The plate can have different touch fields arranged thereon which correspond to different switching functions. The touch elements of touch switches must have a certain size and certain mutual distances to allow their selective operation by the touch of a finger. As a result, touch switches for a plurality of switching functions will form relatively large panels which give a clumsy visual impression. In the installation switch of the invention, any desired number of switch areas or touch fields can be provided while the overall touch panel will still not look bulky or large-surfaced. This is because a transparent switching plate is not optically perceived as a switch means and appears as a mere ornament.

Preferably, the touch panel is arranged on the base portion in such a manner that an open free space is provided under the plate. In the present context, an open free space is meant to a hollow space which is open laterally or also in the downward direction. At least a portion of the glass plate which is provided with touch elements is not supported at its back. Support can be provided either at one end of the plate, thus having the plate freely project in a cantilevered manner, or on opposite edges.

In the installation switch of the invention, the plate forming the carrier for the switch elements has the appearance of a light-weighted and flat component whose electric function is visually hidden from the observer and which will be perceived as an optical ornament. Nonetheless, the plate supports at least one switch element and preferably a plurality of switch elements. This makes it possible to enlarge the functionally effective touch area far beyond the outer surface area of the installation box without causing the switch panel to take on a massive and large-surfaced impression. Of course, the switch elements can be marked on the plate by contoured or colored fields so that the user will know which touch field to press for initiating a respective function.

Preferably, the touch panel is oriented at an inclination in the manner of a lectern. Since the switches are normally arranged below eye level, the user's glace will in this embodiment fall almost perpendicularly onto the plate. Further, pressing the switch elements is facilitated.

The base portion having the touch panel attached thereon is suitably provided with contacts and holding elements, arranged to engage electric contacts of the installation housing and respectively mechanical holding supports of the support plate. In this manner, the base portion can be mounted to the installation housing and the support plate, respectively. In many cases, a simple plug connection will be sufficient for reliable attachment of the base portion to the installation housing. However, also an additional screw-type connection can be provided for secure attachment.

The base portion preferably includes an electronic selection circuit for generating, from the touch signals, transmission signals to a circuit included in the installation housing. This feature pertains to the case where the touch panel comprises a plurality of switch elements. The touch signal generated upon actuation of a switch element is a low voltage signal which is first processed in the selection circuit and then is supplied to the circuit included in the installation housing. This offers the possibility to connect the base portion to the installation housing via a two-pole plug adapted to transmit signals from more than one switch element, e.g. by encoding.

The installation switch can be provided as a mains switch for switching the voltage of the supply network. In this case, the installation housing is provided with a power switch which is preferably arranged as an electronic switch. This switch can also have an additional dimming function. However, it is also possible to provide the installation switch as a low voltage switch for in-house information distribution network technology. In this case, the installation housing includes a bus coupling device with microprocessor, for exchanging telegrams with other bus coupling devices or a central unit via a bus installed in the building. These telegrams contain information on the switch state of the switch elements of the respective installation switch.

Embodiments of the invention will be explained in greater detail hereunder with reference to the drawings.

BRIEF DESCRIPTION OF THE DRAWINGS

FIG. 1 is a side view of a first embodiment of the unit comprising a base portion and a touch panel, FIG. 2 is a vertical sectional view of an installation box accommodating an installation housing with support plate, FIG. 3 is a front view of the installation housing with support plate.

DESCRIPTION OF THE PREFERRED EMBODIMENTS

Figure 4:
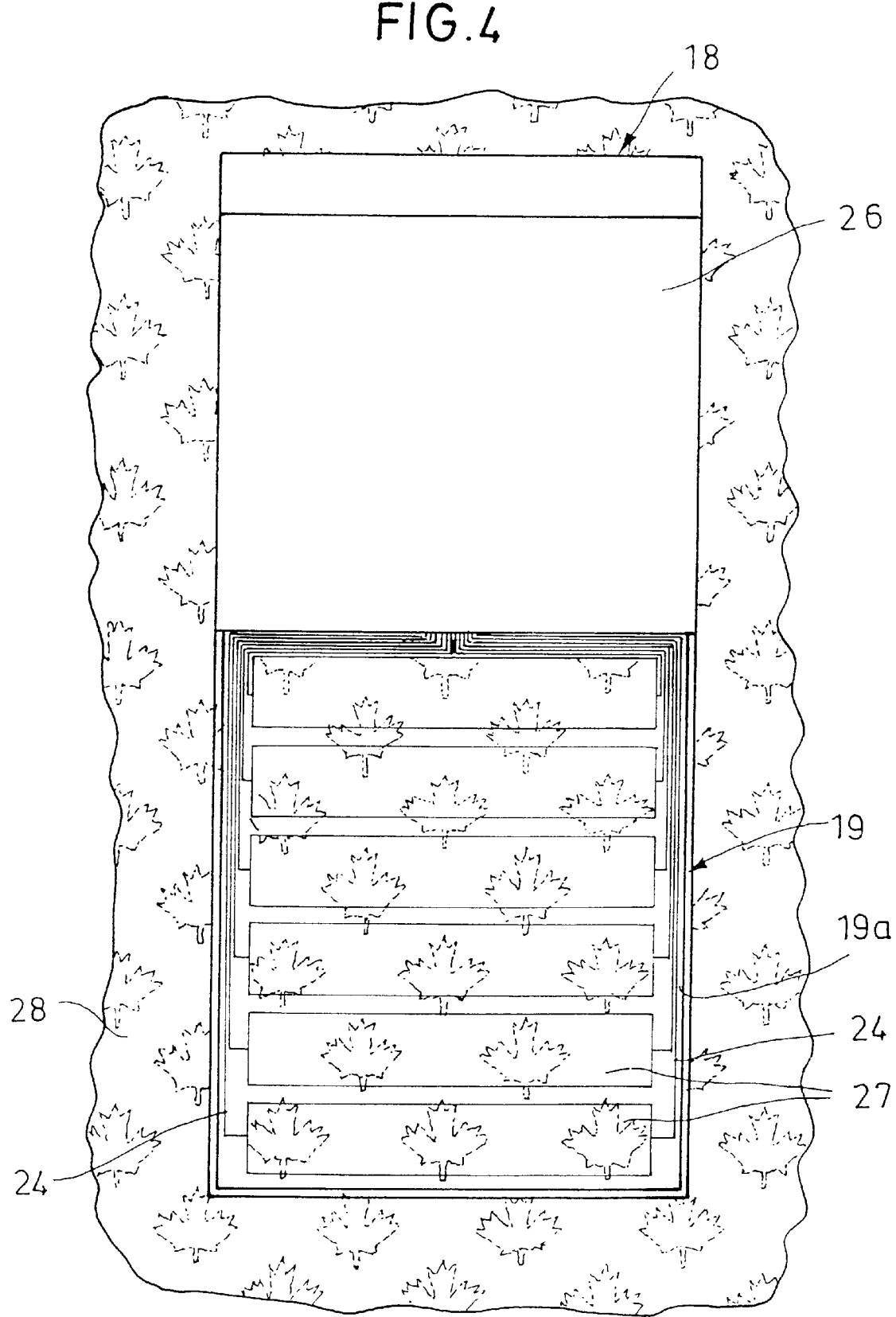
FIG. 4 is a front view of the installation housing of FIGS. 1–3.

All of the illustrated installation switches comprise a substantially cylindrical installation housing 10 to be inserted into a customary installation box 11 for electric installation. Installation housing 10 is provided with a connection means 12 for the cores of an installation line 13 which in FIG. 2 is a bus line, i.e. a low-voltage information line. On its front side, which is visible in FIG. 3, installation housing 10 comprises electric contacts 14 in the form of plug sockets. The installation housing is provided with a support plate 15 forming a laterally projecting frame. Support plate 15 is made of metal and comprises a plurality of cutouts; to be counted among these cutouts are also those which form holding supports 16 for the holding elements of a base portion. Also arranged on the support plate are holding claws (not shown) adapted to be tensioned such that the support plate 15 with installation housing 10 will be clamped on installation box 11.

The installation housing 10 with the support plate 15 will be mounted in the installation box 11 which is provided as a concealed box, with the support plate 15 arranged flush with the wall of the room. Then, the functional unit 17 of FIG. 1, comprising the base portion 18 and the support plate 19, will be attached, by way of plug connection, to support frame 15 and installation housing 10, respectively. For this purpose, mechanically elastic holding elements 20 and electric contacts 21 are provided on the backside of the base portion. The holding elements 20 enter into locking engagement with the holding supports 16 of support plate 15 while the electric contacts 21 engage the sockets of the contacts 14 of installation housing 10.

Base portion 18 comprises a housing of a rectangular shape when viewed from the front, with its dimensions being slightly larger than those of support plate 15. The front side 23 of base portion 18 is inclined in the manner of a lectern, i.e. its lower end is arranged at a larger distance from the backside 22 than its upper end. Attached to the front side 23 is the touch panel 19, projecting downward beyond base portion 18 by more than half the vertical height of the base portion Touch panel 19 is configured generally in the manner described in WO 92/04724 and comprises a transparent plate having the traces embedded therein, thus forming switching elements to be actuated by mechanical pressure. The traces 24 are guided out of an edge of touch panel 19 as connection lugs 25 and connected to terminals (not shown) of base portion 22.

That part of touch panel 19 which is arranged on base portion 18 is covered by a decorative plate 26. The plate can be replaced to comply with different aesthetic tastes.

The part 19a of the touch panel projecting beyond base portion 18 comprises a plurality of sensor elements 27, each of them forming a touch field to be pushed for performing a switch process. The fields can be contoured by thin lines or be marked in another manner to visualize the boundaries of touch element 27. Each touch element 27 has traces 24 leading thereto which will be connected among each other when the touch element is pushed.

As illustrated in FIG. 4, touch panel 19 inclusive of the touch elements 27 is transparent so that the wallpaper extending therebehind is visible. Between this wallpaper and the backside of touch panel 19, however, a free space is arranged. Touch panel 19 projects in a cantilevered manner from base portion 18 and appears to be suspended in the air.

Figure 5:
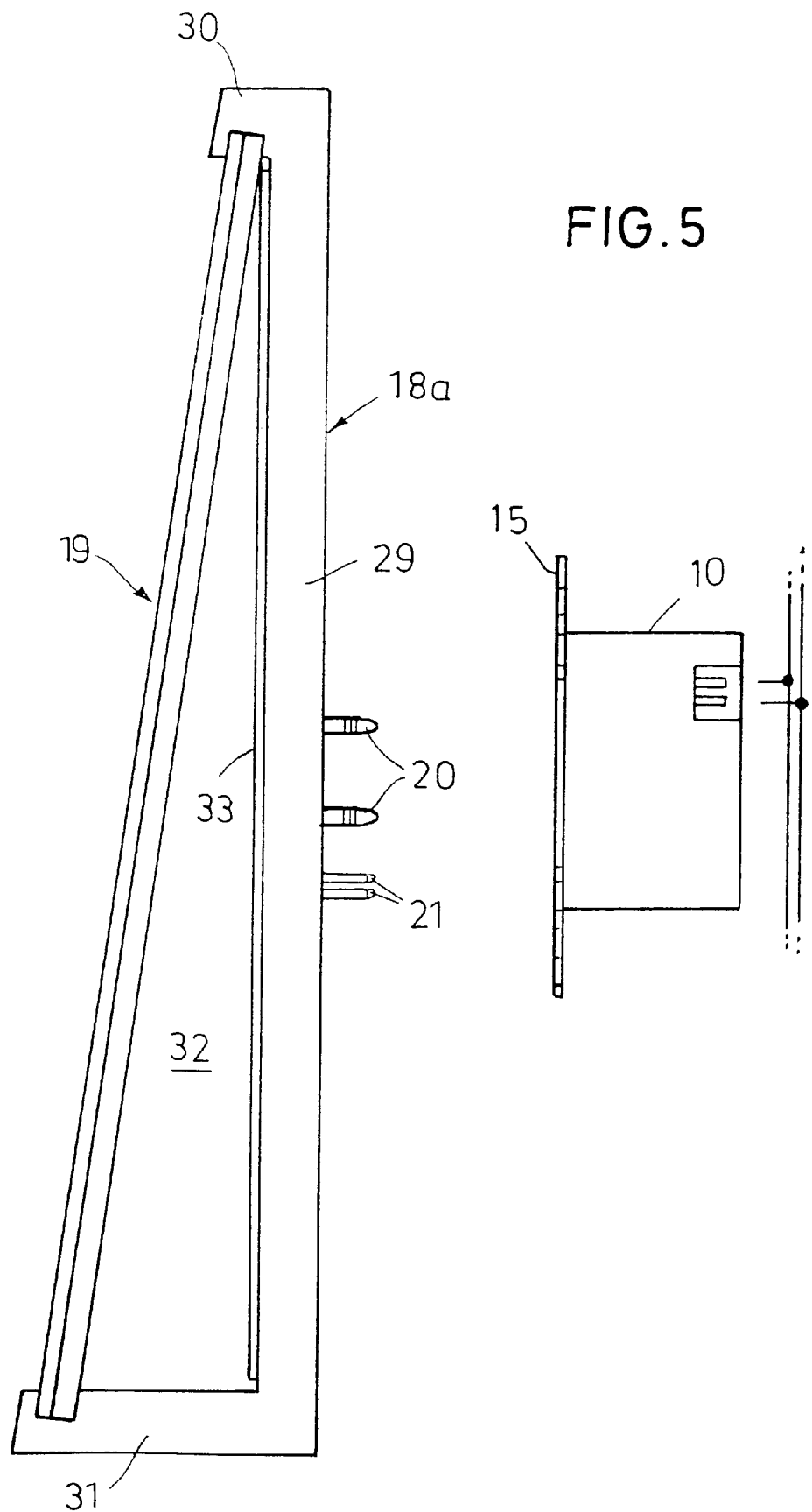
FIG. 5 is a side view of a further embodiment of a unit comprising a base portion and a touch panel.
Figure 6:
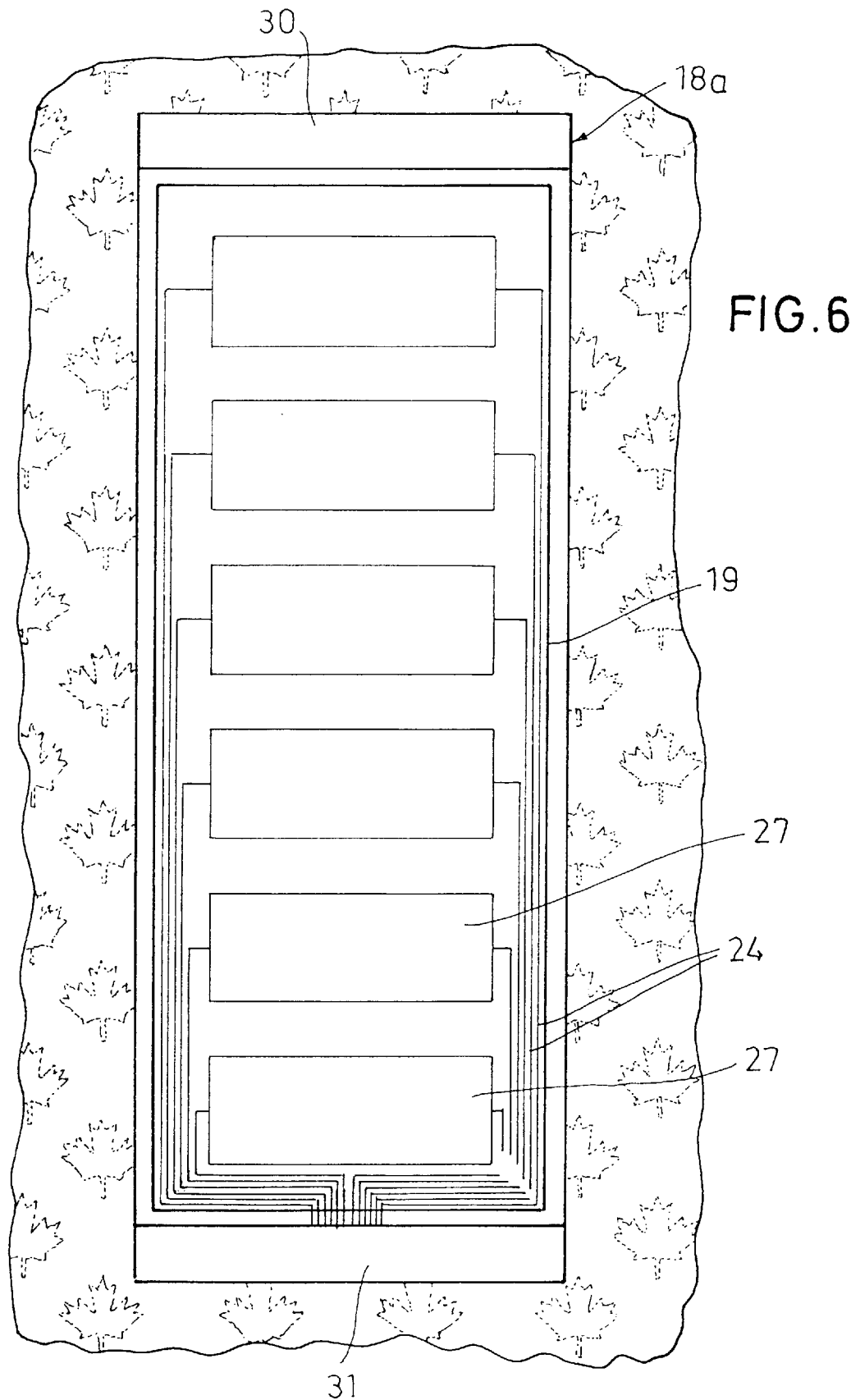
FIG. 6 is a front view of the unit illustrated in FIG. 5.

In the embodiment according to FIGS. 5 and 6, an elongate base portion 18a is sized to have a vertical dimension considerably larger than that of the support plate 15 of the associated installation housing 10. Thus, base portion 18 comprises an elongate flat base portion housing 29, with the mechanical holding elements 20 and the electric contacts 21 projecting therefrom. A horizontal edge bar 30 extends along the upper end of base portion housing 29, and a horizontal edge bar 31 extends along the lower end. Edge bar 31 is arranged to project farther than edge bar 30 so that the touch panel 19, having its upper and lower edges engaged in the edge bars 30,31, is oriented at a lectern-like inclination. Also in this embodiment, a laterally open free space 32 exists behind the support plate 19. Through the transparent touch panel 19, the front side 33 of base portion 29 is visible. This front side can be provided as a decorative plate.

As evident from FIG. 6, the area with the switch elements 27 arranged therein extends across the whole surface of touch panel 19.

Figure 7:
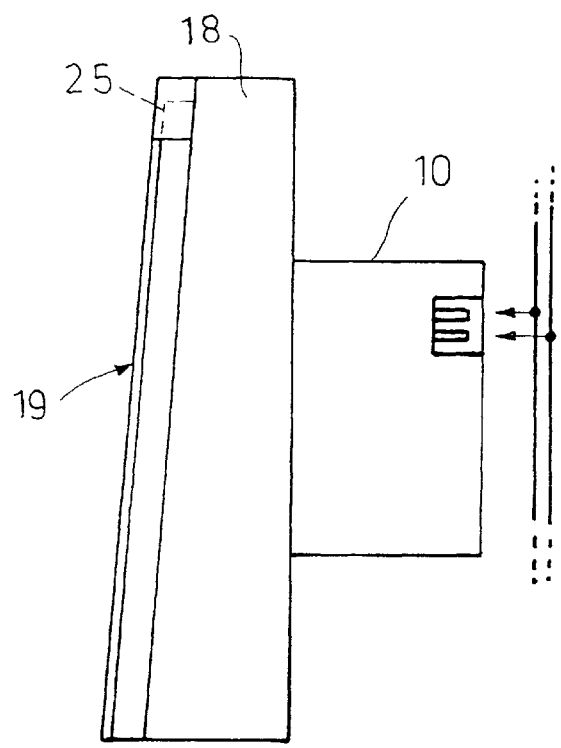
FIG. 7 is a side view of a third embodiment of the installation switch.
Figure 8:
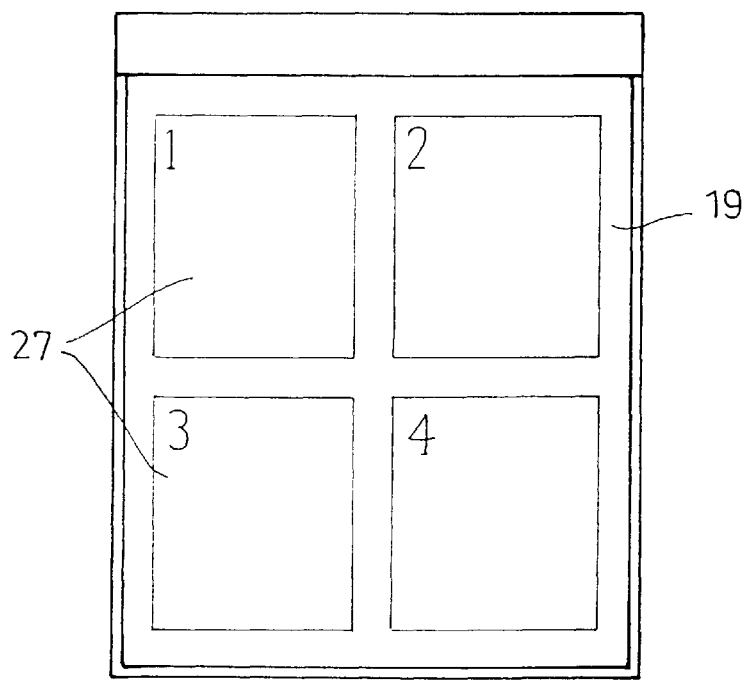
FIG. 8 is a front view of the installation switch of FIG. 7.

FIGS. 7 and 8 illustrate an embodiment comprising a base portion 18 identical to that in FIG. 1. The touch panel, however, is shorter so as not to project beyond base portion 18. The touch panel covers nearly the whole front side of the base portion and has a plurality of switch elements 7 arranged thereon.

Since the switch elements in the transparent touch panel 19 are only adapted to switch low voltage, base portion 18 and 18a, respectively accommodates an electronic selection circuit to detect the respective switch state of a switch element and to communicate this state to the electronic evaluation circuit included in installation housing 10. The evaluation circuit can then transmit the switch state to a bus line. As an alternative, the installation housing can have a power switch arranged therein for switching the mains voltage so that the installation switch can be used to directly switch a load.

Although a preferred embodiment of the invention has been specifically illustrated and described herein, it is to be understood that minor variations may be made in the apparatus without departing from the spirit and scope of the invention, as defined the appended claims.

I claim:

1. An installation switch for a building installation comprising an installation housing (10) provided with a support plate (15), a base portion (18) detachably arranged in front of the installation housing (10), a touch panel (19) attached to the base portion (18), said touch panel (19) including at least one pressure-actuated switch element (27), and the touch panel (19) including a transparent plate.

2. The installation switch as defined in claim 1 wherein the touch panel (19) is attached to the base portion (18) such that an open free space (32) is provided under the touch panel (19).

3. The installation switch as defined in claim 2 wherein the touch panel (19) projects cantilevered from the base portion (18).

4. The installation switch as defined in claim 2 wherein the touch panel (19) has two edges attached to the base portion (18a).

5. The installation switch as defined in claim 2 wherein the touch panel (19) is inclined relative to a vertical plane.

6. The installation switch as defined in claim 2 wherein a decorative plate (26) concealing the base portion (18) is attached to the plate.

7. The installation switch as defined in claim 2 wherein the installation housing (10) includes electric contacts (14) and the support plate (15) includes mechanical holding supports (16); and the base portion (1.8) includes contacts (21) and holding elements (20) for engaging the respective electric contacts (14) and mechanical holding supports (16).

8. The installation switch as defined in claim 2 wherein the base portion (18) includes an electric selection circuit for generating transmission signals from sensor signals for a circuit included in the installation housing (10).

9. The installation switch as defined in claim 1 wherein the touch panel (19) projects cantilevered from the base portion (18).

10. The installation switch as defined in claim 9 wherein the touch panel (19) has two edges attached to the base portion (18a).

11. The installation switch as defined in claim 9 wherein the touch panel (19) is inclined relative to a vertical plane.

12. The installation switch as defined in claim 9 wherein the installation housing (10) includes electric contacts (14) and the support plate (15) includes mechanical holding supports (16); and the base portion (18) includes contacts (21) and holding elements (20) for engaging the respective electric contacts (14) and mechanical holding supports (16).

13. The installation switch as defined in claim 9 wherein the base portion (18) includes an electric selection circuit for generating transmission signals from sensor signals for a circuit included in the installation housing (10).

14. The installation switch as defined in claim 1 wherein the touch panel (19) has two edges attached to the base portion (18a).

15. The installation switch as defined in claim 1 wherein the touch panel (19) is inclined relative to a vertical plane.

16. The installation switch as defined in claim 1 wherein a decorative plate (26) concealing the base portion (18) is attached to the plate.

17. The installation switch as defined in claim 16 wherein the installation housing (10) includes electric contacts (14) and the support plate (15) includes mechanical holding supports (16); and the base portion (18) includes contacts (21) and holding elements (20) for engaging the respective electric contacts (14) and mechanical holding supports (16).

18. The installation switch as defined in claim 16 wherein the base portion (18) includes an electric selection circuit for generating transmission signals from sensor signals for a circuit included in the installation housing (10).

19. The installation switch as defined in claim 1 wherein the installation housing (10) includes electric contacts (14) and the support plate (15) includes mechanical holding supports (16); and the base portion (18) includes contacts (21) and holding elements (20) for engaging the respective electric contacts (14) and mechanical holding supports (16).

20. The installation switch as defined in claim 1 wherein the base portion (18) includes an electric selection circuit for generating transmission signals from sensor signals for a circuit included in the installation housing (10).

21. The installation switch as defined in claim 1 wherein the installation housing (10) includes a power switch.

22. The installation switch as defined in claim 1 wherein the installation housing (10) includes a bus coupling device.

* * * * *